(12) United States Patent
Otsuka et al.

(10) Patent No.: US 11,254,572 B2
(45) Date of Patent: Feb. 22, 2022

(54) GLASS-COATED ALUMINUM NITRIDE PARTICLES, METHOD FOR PRODUCING SAME, AND HEAT DISSIPATING RESIN COMPOSITION CONTAINING SAME

(71) Applicant: SHOWA DENKO K.K., Tokyo (JP)

(72) Inventors: Yuki Otsuka, Yokohama (JP); Hidetoshi Okamoto, Yokohama (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/955,493

(22) PCT Filed: Dec. 10, 2018

(86) PCT No.: PCT/JP2018/045351
§ 371 (c)(1),
(2) Date: Jun. 18, 2020

(87) PCT Pub. No.: WO2019/124147
PCT Pub. Date: Jun. 27, 2019

(65) Prior Publication Data
US 2020/0339419 A1    Oct. 29, 2020

(30) Foreign Application Priority Data

Dec. 21, 2017  (JP) .............................. JP2017-245621
Feb. 27, 2018  (JP) .............................. JP2018-033383

(51) Int. Cl.
*C01B 21/072* (2006.01)
*C09C 1/00* (2006.01)

(52) U.S. Cl.
CPC .............. *C01B 21/072* (2013.01); *C09C 1/00* (2013.01)

(58) Field of Classification Search
None
See application file for complete search history.

(56) References Cited

U.S. PATENT DOCUMENTS 5,234,712 A * 8/1993 Howard .............. C01B 21/0728
427/215

FOREIGN PATENT DOCUMENTS

JP       5-247181 A      9/1993
JP      05247181 A  *   9/1993
(Continued)

OTHER PUBLICATIONS

Notice of Reasons for Rejection for corresponding TW 107145844, dated Jul. 11, 2019.
(Continued)

*Primary Examiner* — Daniel S Gatewood
(74) *Attorney, Agent, or Firm* — Sughrue Mion, PLLC

(57) ABSTRACT

Glass-coated aluminum nitride particles and a method for producing the same. The glass-coated aluminum nitride particles include aluminum nitride particles and a glass phase which covers at least a part of the surface of each aluminum nitride particle. The glass phase is a composition which contains at least a glass component; and the proportion of the composition containing a glass component is 0.2 parts by weight to 5.0 parts by weight with respect to 100 parts by weight of the aluminum nitride particles. The composition containing the glass component further contains boron nitride particle; and the aluminum nitride particles have a volume cumulative d50 of from 10 μm to 200 μm.

9 Claims, 6 Drawing Sheets

(56) References Cited

FOREIGN PATENT DOCUMENTS

| | | | |
|---|---|---|---|
| JP | 11-080509 | A | 3/1999 |
| JP | 11-269302 | A | 10/1999 |
| JP | 2001-342074 | A | 12/2001 |
| JP | 3446053 | B2 | 9/2003 |
| JP | 4088768 | B2 | 5/2008 |
| JP | 4804023 | B2 | 10/2011 |
| JP | 2015-071730 | A | 4/2015 |
| JP | 2015-101510 | A | 6/2015 |
| JP | 2017-036183 | A | 2/2017 |
| JP | 2017036183 | A * | 2/2017 |

OTHER PUBLICATIONS

International Search Report for PCT/JP2018/045351, dated Feb. 19, 2019.

* cited by examiner

GLASS-COATED ALUMINUM NITRIDE PARTICLES, METHOD FOR PRODUCING SAME, AND HEAT DISSIPATING RESIN COMPOSITION CONTAINING SAME

CROSS REFERENCE TO RELATED APPLICATIONS

This application is a National Stage of International Application No. PCT/JP2018/045351 filed Dec. 10, 2018, claiming priority based on Japanese Patent Application No. 2017-245621 filed Dec. 21, 2017 and Japanese Patent Application No. 2018-033383 filed Feb. 27, 2018.

TECHNICAL FIELD

The present invention relates to glass-coated aluminum nitride particles, a method for producing the same, and a heat dissipating resin composition comprising the same. In particular, it relates to particles comprising of a composition comprising a glass component covering the surface of aluminum nitride particles.

BACKGROUND ART

Aluminum nitride has high thermal conductivity, and excellent electrical insulation properties. However, aluminum nitride undergoes hydrolysis by reaction with moisture, and degenerates to aluminum hydroxide, which has a low thermal conductivity. The hydrolysis of aluminum nitride also proceeds by atmospheric moisture. Therefore, there is concern that the performance of products to which aluminum nitride is added will degraded under conditions of high temperature and high moisture.

For aluminum nitride, the techniques for attaining increased moisture resistance, by a method of forming on the surface a layer consisting of Si—Al—O—N on the surface of an aluminum nitride powder (for example, refer to Patent Document 1), a method of forming a coating layer with a silicate treatment agent and a coupling agent on the surface of an aluminum nitride powder (for example, refer to Patent Document 2), a method of leaving organic groups on the surface of an aluminum nitride powder which has been treated with a silicate agent (for example, refer to Patent Document 3), and aluminum nitride particles which have been surface-modified using a specified acidic phosphate ester (for example, refer to Patent Document 4), and the like, have been proposed.

For the moisture proof aluminum nitride powder of Patent Document 1, after having coated a silicate ester layer on the aluminum nitride particle surface, a layer consisting of Si—Al—O—N is formed on the surface by burning at a temperature of 350 to 1000° C. For the aluminum nitride based powder of Patent Document 2, after a surface treatment with a silicate treatment agent and a coupling agent, a coating layer is formed on the surface by carrying out a high temperature heat treatment. For the aluminum nitride powder of Patent Document 3, after surface treatment with a silicate treatment agent, compatibility with a resin is improved by leaving organic groups, by heat treatment at a temperature which does not exceed 90° C. For the surface modified particles of Patent Document 4, the moisture resistance is improved by aluminum nitrate particles which are surface-modified using a specified acidic phosphate ester.

Patent Document 1: Japanese Patent No. 3446053
Patent Document 2: Japanese Patent No. 4088768
Patent Document 3: Japanese Patent No. 4804023
Patent Document 4: Japanese Unexamined Patent Application, Publication No. 2015-71730

DISCLOSURE OF THE INVENTION

Problems to be Solved by the Invention

However, in the prior art techniques, the following problems are present. The aluminum nitrate powder, in order to attain increased moisture resistance, has an Si—Al—O—N reaction layer, a coating layer formed of a silicate treatment agent and a coupling agent, a surface-modified layer, and the like. As a result, improvement of the moisture resistance can be recognized, but the level is not yet sufficient, and to the contrary, the coating films used as a means for attaining increased moisture resistance in many cases reduce the original thermal conductivity of the aluminum nitride. Furthermore, there is also the problem that as a filler, it becomes difficult to mix with various materials having a high filling rate.

The present invention was made in order to solve the above-described problems, and has the objective of providing glass-coated aluminum nitride particles which make it possible to attain increased moisture resistance while maintaining high thermal conductivity, a method for producing the same, and a heat dissipating resin composition comprising the same.

Means for Solving the Problems

The glass-coated aluminum nitride particles of the first aspect of the present invention comprise aluminum nitride particles, and a glass phase covering at least a part of a surface of the aluminum nitride particles, wherein the glass phase is a composition comprising at least a glass component, and has a ratio of 0.1 parts by weight to 5.0 parts by weight with respect to 100 parts by weight of the aluminum nitride particles, and the aluminum nitride particles have a volume cumulative d50 of 10 μm to 200 μm.

Further, the glass-coated aluminum nitride particles of the second aspect of the present invention comprise aluminum nitride particles and a glass phase covering at least a part of a surface of the aluminum nitride particles, wherein the glass phase is a composition comprising at least a glass component, and has a ratio of 0.2 parts by weight to 5.0 parts by weight with respect to 100 parts by weight of the aluminum nitride particles, and further comprises boron nitride particles, and the aluminum nitride particles have a volume cumulative d50 of 10 μm to 200 μm.

Further, the method for producing the glass-coated aluminum nitride particles of the third aspect of the present invention is a method for producing glass-coated aluminum nitride particles comprising aluminum nitride particles and a glass phase covering at least a part of a surface of the aluminum nitride particles, wherein a volume cumulative d50 of a glass frit which is a raw material of the glass phase is 0.3 μm to 50 μm, comprising a first step of forming a mixture by mixing the aluminum nitride particles and the glass frit, a second step of obtaining coated particles wherein the glass frit is coated onto the aluminum nitride particles by a heat treatment of the mixture after the first step is completed, at a temperature of no less than the glass transition temperature of the glass frit and no more than 2000° C., and a third step of making the volume cumulative d50 of the particles 10 μm to 200 μm by grinding the coated particles after the second step is completed.

Further, the method for producing the glass-coated aluminum nitride particles of the fourth aspect of the present invention is a method for producing glass-coated aluminum nitride particles having aluminum nitride particles and a glass phase covering at least a part of a surface of the aluminum nitride particles, wherein a volume cumulative d50 of the glass frit which is a raw material of the glass phase is 0.3 μm to 50 μm, comprising a first step of forming a mixture by mixing aluminum nitride particles, glass frit, and boron nitrate particles having a volume cumulative d50 of 0.3 μm to 30 μm, a second step of obtaining coated particles wherein the glass frit is coated onto the aluminum nitride particles by a heat treatment of the mixture after the first step is completed, at a temperature of no less than the glass transition temperature of the glass frit and no more than 2000° C., and a third step of making the volume cumulative d50 of the particles 10 μm to 200 μm by grinding the coated particles after the second step is completed.

Further, the fifth aspect of the present invention is a heat dissipating resin composition comprising any of the glass-coated aluminum nitride particles described above.

Effects of the Invention

According to the glass-coated aluminum nitride particles, the method for producing the same, and the heat dissipating resin composition according to the present invention, it is possible to obtain glass-coated aluminum nitride particles which make it possible to attain increased moisture resistance while maintaining high thermal conductivity, a method for producing the same, and a heat dissipating resin composition comprising the same.

PREFERRED MODE FOR CARRYING OUT THE INVENTION

Figure 1:
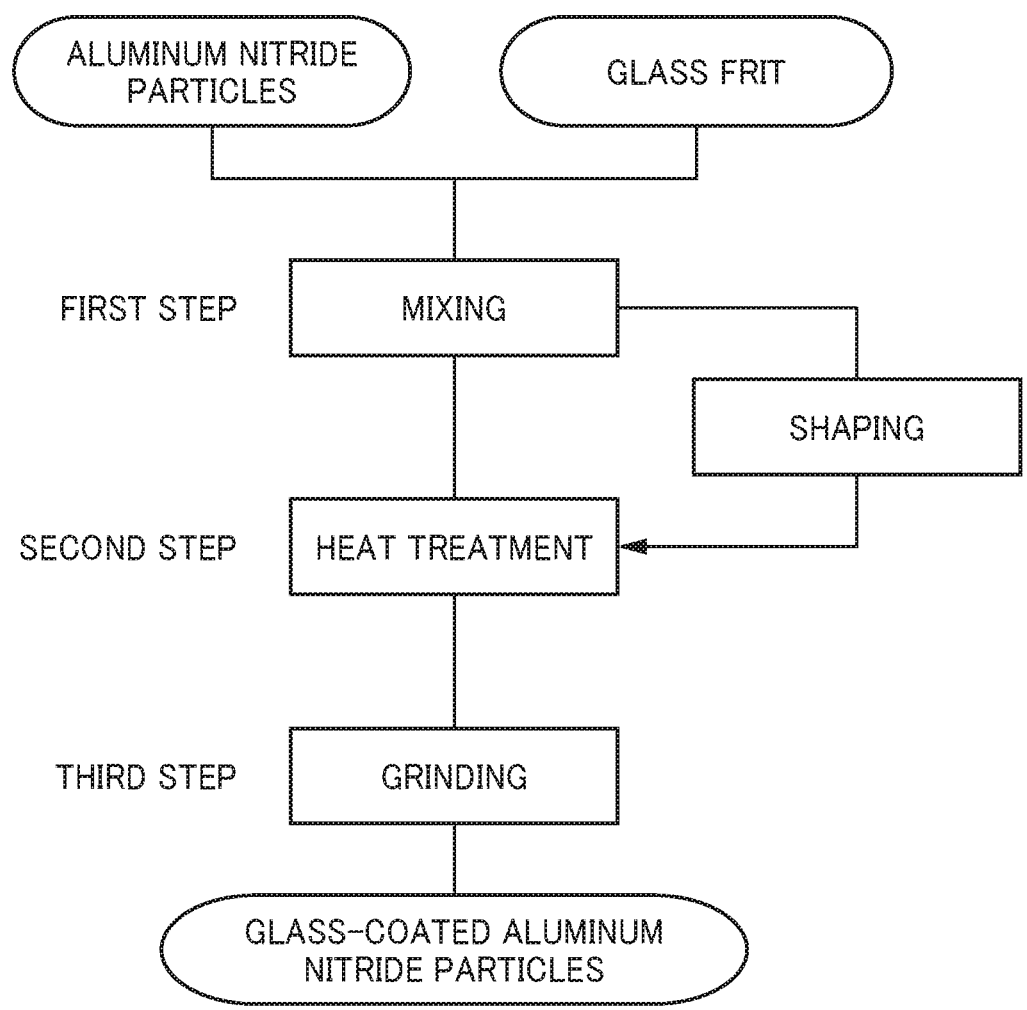
FIG. 1 is a flowchart showing the method for producing the glass-coated aluminum nitride particles according to an embodiment of the present invention.

Below, preferred embodiments of the present invention will be explained in detail.
(1) Glass-coated aluminum nitride particles comprising aluminum nitride particles and a glass phase covering at least a part of a surface of the aluminum nitride particles, wherein the glass phase is a composition comprising at least a glass component, having a ratio of 0.1 parts by weight to 5.0 parts by weight with respect to 100 parts by weight of the aluminum nitride particles, and the aluminum nitride particles have a volume cumulative d50 of 10 μm to 200 μm.
(2) The glass-coated aluminum nitride particles according to (1), wherein the composition comprising the glass component has a ratio of 0.2 parts by weight to 5.0 parts by weight with respect to 100 parts by weight of the aluminum nitride particles, and further comprises boron nitride particles.
(3) The glass-coated aluminum nitride particles according to (2), wherein the boron nitride particles have a ratio of 0.1 parts by weight to 10.0 parts by weight with respect to 100 parts by weight of the aluminum nitride particles.
(4) The glass-coated aluminum nitride particles according to any one of (1) to (3), wherein an average aspect ratio of the aluminum nitride particles is 0.8 or more.
(5) A method for producing glass-coated aluminum nitride particles comprising aluminum nitride particles and a glass phase covering at least a part of a surface of the aluminum nitride particles, wherein a volume cumulative d50 of a glass frit which is a raw material of the glass phase is 0.3 μm to 50 μm, comprising a first step of forming a mixture by mixing the aluminum nitride particles and the glass frit, a second step of obtaining coated particles by coating the glass frit onto the aluminum nitride particles by heat treating the mixture after the completion of the first step, at a temperature of the glass transition temperature of the glass frit or more, and 2000° C. or less, and a third step of grinding the coated particles after the completion of the second step, to make particles with a volume cumulative d50 of 10 μm to 200 μm.
(6) A method for producing glass-coated aluminum nitride particles according to (5), carried out under an atmosphere which does not include oxygen.
(7) A method for producing glass-coated aluminum nitride particles according to (5) or (6), wherein the heat treatment of the second step is carried out at 400° C. to 1400° C., in a range of 30 min to 3 hrs.
(8) A method for producing glass-coated aluminum nitride particles according any one of to (5) to (7), further comprising, between the first step and the second step, a step of shaping step by applying pressure to the mixture of the aluminum nitride particles and the glass frit which is a raw material of the glass phase.
(9) A method for producing glass-coated aluminum nitride particles according to (7), wherein the shaping step is carried out at a pressure of 10 MPa to 300 MPa.
(10) A method for producing glass-coated aluminum nitride particles comprising aluminum nitride particles and a glass phase covering at least a part of a surface of the aluminum nitride particles, wherein a volume cumulative d50 of a glass frit which is a raw material of the glass phase is 0.3 μm to 50 μm, comprising a first step of forming a mixture by mixing the aluminum nitride particles, the glass frit, and boron nitrate particles having a volume cumulative d50 of 0.3 μm to 30 μm, a second step of obtaining coated particles by coating the glass frit onto the aluminum nitride particles by heat treating the mixture after the completion of the first step, at a temperature of the glass transition temperature of the glass frit or more, and 2000° C. or less, and a third step of making the volume cumulative d50 of the particles 10 μm to 200 μm by grinding the coated particles after the second step is completed.
(11) A method for producing glass-coated aluminum nitride particles according to (10), wherein the second step is carried out under an atmosphere which does not include oxygen.

(12) A method for producing glass-coated aluminum nitride particles according to (10) or (11), wherein the heat treatment of the second step is carried out at 400° C. to 1400° C., in a range of 30 min to 3 hrs.

(13) A method for producing glass-coated aluminum nitride particles according to any one of (10) to (12), further comprising, between the first step and the second step, a step of shaping by applying pressure to the mixture of the aluminum nitride particles, the glass frit, and the boron nitride particles.

(14) A method for producing glass-coated aluminum nitride particles according to (13), wherein the shaping step is carried out at a pressure of 10 MPa to 300 MPa.

(15) A heat dissipating resin composition comprising the glass-coated aluminum nitride particles according to any one of (1) to (4).

[Glass-Coated Aluminum Nitride Particles]

The glass-coated aluminum nitride particles according to the first to fourth aspects of the present invention have aluminum nitride particles, and a glass phase as basic constituents. Herein, a glass phase is one wherein a glass frit covering at least a part of the surface of the aluminum nitride particles is melted by a predetermined method. Further, as described later, the glass-coated aluminum nitride particles, in consideration of the moisture resistance, adherence of the glass coating, and the like, may also have a constitution where boron nitride particles are included in the above described basic constituents.

First, an explanation is given concerning glass-coated aluminum nitride particles constituted of aluminum nitride particles and a glass phase.

The glass-coated aluminum nitride particles use aluminum nitride particles as a raw material. As the aluminum nitride particles, well-known ones such as commercially available ones and the like may be used.

The production method for the aluminum nitride particles is not particularly limited, but for example, is a direct nitriding method wherein metallic aluminum powder and nitrogen or ammonia are directly reacted, or a reduction nitriding method wherein a nitriding reaction is carried out by heating under a nitrogen or ammonia atmosphere at the same time that alumina is being carbon-reduced, or the like. Further, as the aluminum nitride particles, it is also possible to use particles which are granularized by sintering agglomerates of aluminum nitride fine particles. In particular, sintered granules of high purity aluminum nitride having a volume cumulative d50 on the order of 1 μm can be suitably used.

Herein, high purity aluminum nitride is particles having a very low content of oxygen, and an extremely few metallic impurities.

As described above, the high purity aluminum nitride is suitable in order to obtain favorable thermal conductivity. These aluminum nitride particles may be used individually, or may be used in combination.

The shape of the aluminum nitride particles used in the present embodiments is not particularly limited, but amorphous (ground form), spherical, mixtures of amorphous and spherical or the like may be appropriately combined. In the case that aluminum nitride particles are used dispersed in a resin as a filler for a heat-dispersive material, the larger the volume ratio (filler amount) of the aluminum nitride particles, the higher the thermal conductivity. Therefore, the aluminum nitride particles preferably have a shape which is near spherical, whereby an increase in viscosity resulting from adding the aluminum nitride is small.

The index of the shape of the aluminum nitride particles, as represented by the aspect ratio, is preferably in the range of 0.8 to 1.0, more preferably in the range of 0.9 to 1.0. Herein, the aspect ratio is defined as the arithmetic mean value of the ratio D1/D2 when the short diameter (D1) and the long diameter (D2) are respectively measured from an electron microscope photograph of 100 randomly selected particles.

Further, in the respective electron microscope photographs, for each of the one or more randomly selected particles, the short diameter is the smallest length sandwiched by a pair of parallel lines, and the long diameter is the largest length sandwiched by a pair of parallel lines.

The volume cumulative d50 of the aluminum nitride particles used in the present embodiments is 10 to 200 μm. More preferably, it is in the range of 30 to 100 μm. In the case that the volume cumulative d50 of the aluminum nitride particles is 10 μm or more, a uniform glass coating can be readily formed. As a result, the moisture resistance of the glass coated aluminum nitride particles is improved.

Further, in the case that the volume cumulative d50 of the aluminum nitride particles is 200 μm or less, the size of the filler determining the thickness of the heat dissipating material can be minimized. As a result, it is possible to achieve thin layers of the heat dissipating material provided in power system electrical components.

The average particle diameter of the various particles used in the present embodiments is the value determined from the particle size distribution according to the laser diffraction scattering method. Herein, the average particle diameter is shown as the particle diameter (volume cumulative d50) at which the volume value of the volume cumulative becomes 50% with respect to the particle size distribution. As the specific measurement, the volume cumulative d50 was obtained by using a laser diffraction•scattering-type particle diameter distribution measurement device (Microtrak MT3300EX2: manufactured by MicrotracBEL Corp.).

Next, the glass phase which coats the surface of the aluminum nitride particles of the first aspect and third aspect is explained. The glass phase is one made by melting a glass frit. Further, the glass frit is a composition comprising glass components as described below.

In the glass-coated aluminum nitride particles according to the embodiments of the present invention, a glass phase of a melted glass frit coats at least a part of, and preferably all of, the aluminum nitride particle surface. Further, the glass frit is a composition comprising a glass component.

The glass component of the glass frit preferably constitutes 80 weight % or more, more preferably 90 weights or more. The glass component is not particularly limited, but commercial glass silicates, glass phosphosilicates and the like may be used, and preferably comprises two or more components selected from $SiO_2$, $Al_2O_3$, and $B_2O_3$.

Further, as explained later in the method for producing the glass-coated aluminum nitride particles, for the glass frit, if it is desired to lower the temperature of the heat treatment when coating in the second step, a bismuth-based glass, tin-phosphate based glass, vanadium-based glass, lead-based glass or the like may be used to lower the melting point.

However, based on instructions by the WEEE and RoHS, from the viewpoint of independent risk assessment of lead, the glass frit is preferably a bismuth-based glass, tin-phosphate-based glass, or vanadium-based glass.

Further, the glass frit, in order to match the thermal expansion coefficient of the coated aluminum nitride particles, may also include a ZnO component (in the case of ZnO, the thermal expansion coefficient is reduced).

Further, the glass frit, from the viewpoint of moisture resistance, preferably has a smaller content of oxides of alkali metals such as $Na_2O$, $K_2O$, and the like. Further, the glass frit may contain optional components such as CaO, SrO, MgO, BaO, SnO, and the like.

For the glass component of the glass frit, a total amount of components selected from $SiO_2$, $Al_2O_3$, and $B_2O_3$ preferably has a ratio of 30 to 95 weight % with respect to the overall composition comprising the glass components. When 30 weight % or more, the glass frit exhibits favorable coating properties, and when 95 weights or less, the effects of the other components are effectively exhibited.

The composition comprising the glass component used in the first aspect and third aspect is preferably in a range of 0.1 to 5.0 parts by weight with respect to 100 parts by weight of the aluminum nitride particles, more preferably 0.2 to 4.0 parts by weight, and even more preferably in a range of 0.5 to 3.0 parts by weight. The reason for this is that when the composition comprising the glass component is 0.1 parts by weight or more, the glass coating of the aluminum nitride particles becomes sufficient, and when 5.0 parts by weight or less, it is possible to suppress a reduction in the thermal conductivity due to the effect of the glass component coating the surface.

Further, in the case that the composition comprising the glass component used in the present embodiments, comprises boron nitride particles, as described later, the ratio of the composition of the glass components with respect to the aluminum nitride particles may differ from that described above.

Next, the boron nitride particles, in the case of a constitution comprising boron nitride particles for the glass-coated aluminum nitride particles of the basic constitution of the second aspect and the fourth aspect, are explained.

The composition comprising the glass components coating at least a part of the aluminum nitride particle surface used in the present embodiments may have a constitution comprising boron nitride particles. The boron nitride is a significant constitutional element of the glass-coated aluminum nitride particles according to the present embodiment, and as described later, affects the method for producing the glass-coated aluminum nitride particles.

The glass-coated aluminum nitride particles according to the present embodiment are obtained by forming a coated glass phase by melting glass frit at the surface of aluminum nitride particles, and after this, grinding the particles of the glass-coated aluminum nitride which have fused to each other when melting and coating.

If a large amount of the glass component is accumulated at the portion where the particles of the glass-coated aluminum nitride adhere to each other, or if the glass coating is thick, or the like, the interface of the aluminum nitrate particles and the glass coating layer may become detached in the process of separating the glass-coated aluminum nitride particles from each other when grinding.

As a result, there is the possibility that the surface of the aluminum nitride particles will become exposed. The exposure of the aluminum nitride particles due to the detachment induces hydrolysis of the aluminum nitride, which causes a reduction in the moisture resistance. Namely, loss of the glass coating must be suppressed to a minimum.

Incidentally, boron nitride particles have the properties of a small Mohs hardness, and being easy to brake along a cleavage plane. Therefore, by adding boron nitride particles to the glass frit, the glass coating layer can readily fracture with the boron nitride particles as a starting point when grinding. The effect of this is that it is possible to obtain individual glass-coated aluminum nitrate particles without detachment of the glass coating.

The added amount of the boron nitride particles is preferably within the range of 0.1 to 10.0 parts by weight with respect to 100.0 parts by weight of the aluminum nitride particles, more preferably 0.5 to 7.0 parts by weight, and even more preferably within the range of 1.0 to 5.0 parts by weight. The reason for this is that when the boron nitride is added at 0.1 parts by weight or more, when grinding, it functions effectively as the starting point of fracturing of the glass-coated aluminum nitrate particles from each other, and at 10.0 parts by weight or less, it is possible to suppress a reduction in the thermal conductivity of the aluminum nitride particles due to the effect of the glass coating layer.

The boron nitride particles are not particularly limited, but hexagonal crystalline boron nitride particles are preferable, and as the particle shape, either of squamous shape or granular shape may be suitably used, but the squamous shape is more preferable.

The volume cumulative d50 of the boron nitride particles is 0.3 to 30 µm, more preferably 0.5 to 15 µm, and even more preferably within the range of 1 to 5 µm. The reason for this is that, in the case that the volume cumulative d50 of the boron nitride particles is 0.3 µm or more, the above described effect of being the starting point of fracturing when grinding is displayed, and in the case that it is 30 µm or less, it is possible to prevent omissions from the glass coating layer.

Next, the glass frit which is a raw material of the glass phase will be explained for the constitution wherein the glass-coated aluminum nitride particles includes boron nitride particles, according to the second aspect and the fourth aspect.

The surface of the aluminum nitride particles used in the glass-coated aluminum nitride particles according to the present embodiments is coated, at least partly, and preferably completely, with a glass phase. The glass phase is a composition comprising a glass component, made by melting a glass frit.

The glass component of the glass frit is preferably comprised at 30 to 90 volume %, more preferably 40 to 80 volume %, and even more preferably within the range of 50 to 70 volume %. Further, as described above, for the glass-coated aluminum nitride particles according to the present embodiments, in the case of comprising a boron nitride, a suitable ratio of the composition of the glass component with respect to the aluminum nitride particles may differ from the case of not comprising the above described boron nitride particles.

The glass component is not particularly limited, but a commercial silicate glass, borosilicate glass or the like may be used, and preferably comprises two or more selected from $SiO_2$, $Al_2O_3$, and $B_2O_3$.

Further, as explained later in the method for producing the glass-coated aluminum nitride particles, for the glass frit, if it is desired to lower the temperature of the heat treatment when coating in the second step, a bismuth-based glass, tin-phosphate based glass, vanadium-based glass, lead-based glass or the like may be used to lower the melting point.

However, based on instructions by the WEEE and RoHS, from the viewpoint of independent risk assessment of lead, the glass frit is preferably a bismuth-based glass, tin-phosphate-based glass, or vanadium-based glass. Further, the glass frit, in order to match the thermal expansion coefficient of the coated aluminum nitride particles, may also include a ZnO component (in the case of ZnO, the thermal expansion coefficient is reduced).

Further, the glass frit, from the viewpoint of moisture resistance, preferably has a smaller content of oxides of alkali metals such as $Na_2O$, $K_2O$, and the like. Further, the glass frit may contain optional components such as CaO, SrO, MgO, BaO, SnO, and the like.

For the glass component of the glass frit, a total amount of components selected from $SiO_2$, $Al_2O_3$, and $B_2O_3$ preferably has a ratio of 30 to 90 weight % with respect to the overall composition comprising the glass components. When 30 weight % or more, the glass frit exhibits favorable coating properties, and when 90 weight % or less, the effects of the other components are effectively exhibited.

The composition comprising the glass components used in the second aspect and fourth aspect preferably has a ratio of 0.2 to 15.0 parts by weight with respect to 100 parts by weight of the aluminum nitride particles, more preferably 0.5 to 10.0 parts by weight, and even more preferably in a range of 1.0 to 5.0 parts by weight. The reason for this is that when the composition comprising the glass component is 0.2 parts by weight or more, the glass coating of the aluminum nitride particles becomes sufficient, and when 15.0 parts by weight or less, it is possible to suppress a reduction in the thermal conductivity due to the effect of the glass component coating the surface.

[Method for Producing the Glass-Coated Aluminum Nitride Particles]

The method for producing the glass-coated aluminum nitride particles according to the embodiments of the present invention is explained below.

First, in the method for producing the glass-coated aluminum nitride particles, the glass frit which is the raw material of the glass phase used for the glass coating is explained.

For the glass-coated aluminum nitride particles according to the present embodiments, a method of forming a glass phase at the aluminum nitride particle surface by melting the glass frit by a heat treatment, after having mixed the aluminum nitride particles and the glass frit, is suitable.

Generally, the glass frit has alumina, silica, calcium oxide, magnesium oxide and the like as a raw material, and is produced by mixing the same, melting in a glass melter, and after cooling, grinding by wet grinding or dry grinding. The temperature in the melting step varies depending on the glass, and is on the order of 800° C. to 1600° C.

As the glass frit, a well-known one such as a commercial product or the like may be used. Namely, a glass frit used for substrates for mobile telephones, substrates for automobiles, conductive pastes of solar electrical cells or the like, or one used for encapsulation•sealing in connection with various electrical•electronic products or the like may be used.

Further, as the components of the glass frit, for example, the same components as the composition of the coating components of the aluminum nitride particles as described above is preferable.

Further, the volume cumulative d50 of the glass frit is 0.3 to 50 µm. Preferably 0.3 to 10 µm, and more preferably in the range of 1 to 5 µm. Namely, in the case that the volume cumulative d50 of the glass frit is 0.3 µm or more, the glass frit is easy to uniformly disperse without agglomeration, and a uniform glass coating can be readily obtained.

Further, in the case that the volume cumulative d50 of the glass frit is 50 µm or less, the glass frit adhered to the surface of the aluminum nitride particles can provide a uniform glass coating film without slip-off.

Next, using FIG. 1, one mode of the method for producing the glass-coated aluminum nitride particles of the third aspect constituted of aluminum nitride particles and glass frit will be explained.

FIG. 1 is a flowchart of the method for producing the glass-coated aluminum nitride particles according to the present embodiment. The method for producing the glass-coated aluminum nitride particles has a first step of mixing the raw materials, a second step of heat treating the mixture, and a third step of grinding in order to obtain the glass-coated aluminum nitride particles.

First, the first step is explained. The first step is a step of mixing the raw materials of the aluminum nitride particles and the glass frit. In the first step of mixing the raw materials, care is taken so that the glass frit is made to adhere as uniformly as possible to the surface of the aluminum nitride particles.

As a powder mixing device, it is possible to use a general powder mixing device. For example, a vessel rotation type V blender, a double cone type blender, a ribbon blender having a mixing blade, a screw type blender or the like, and furthermore, various types of particle compounding devices may be mentioned, and provided that it satisfies the objective of the mixing step, it is not particularly limited.

Further, the first step also includes a step of stably adhering the glass frit to the aluminum nitride particle surface using a binder. The binder is preferably one which is burned in the later described heat treatment step of the second step, and which leaves no vestiges on the surface of the glass-coated aluminum nitride particles, and for example, a paraffin or the like may be used.

Further, the binder is not particularly limited, and for example, a paraffin such as a liquid paraffin or solid paraffin or the like with a weight average molecular weight of 200 to 600 may be used individually or in combinations of two types or more.

Next, the second step is explained. The second step is a step of carrying out a heat treatment of the mixture of the aluminum nitride particles and the glass frit. As the heat treatment oven for carrying out the heat treatment, a general heating oven can be used, provided that it is one which can maintain the mixture of the aluminum nitride particles and the glass frit at a temperature range set in advance.

The heat treatment is required to be carried out at the glass transition temperature of the glass frit or higher, and further, at a temperature of 2000° C. or lower which does not exceed the fusion point of the aluminum nitride particles. Further, as a result of considering the relationship between the heat treatment temperature and the moisture resistance of the coated particles, it was found that the moisture resistance of the coated particles is closely related to the heat treatment temperature.

Namely, from the relationship between the moisture resistance of the coated particles and the heat treatment temperature, it was found that when the heat treatment is carried out in a temperature range of 400° C. to 1400° C., a favorable moisture resistance of the coated particles can be obtained. The heat treatment time in this case is preferably in the range of 30 min to 3 hrs.

When the heat treatment temperature is in the range of 400° C. to 1400° C., by making the heat treatment time 30 min or more, it becomes possible to obtain a uniform coating film of the glass components on the surface of the aluminum nitride particles. Further, by making the heat treatment time 3 hrs or less, a production which attains increased manufacturing efficiency of the glass-coated aluminum nitride particles according to the third embodiment becomes possible.

Herein, the heat treatment of the second step may be carried out in air, but is preferably carried out in an atmosphere which does not include oxygen, such as in an inert gas or in a vacuum. The reason for this is that by preventing the oxidation of aluminum nitride, is it possible to avoid degeneration to alumina, which has poor thermal conductivity. Further, the atmosphere in the heat treatment is not particularly limited, but in consideration of economic efficiency, heat treatment in a nitrogen gas atmosphere is preferable.

Incidentally, the glass transition temperature has a value which differs depending on the measurement method and conditions. In the present embodiment, the glass transition temperature is defined, using Differential Thermal Analysis (DTA), by the first inflection point of the DTA chart. Specifically, it was measured using a differential thermal balance (Thermo plus EVO 2: manufactured by Rigaku Corporation).

Next, in the method for producing the glass-coated aluminum nitride particles according to the present embodiment, the case of including a shaping step between the first step and the second step is explained.

The shaping step is a step of applying pressure so as to uniformly coat the glass frit onto the surface of the aluminum nitride particles. Specifically, for example, after the completion of the first step, the mixture of the aluminum nitride particles and the glass frit is shaped by a pressure of 10 to 300 MPa.

By the shaping step, it is possible to efficiently obtain a uniform glass coating on the aluminum nitride particle surface in the heat treatment step of the second step. Further, by carrying out the shaping step before the heat treatment, a uniform glass coating is formed, and the effect of a moisture resistance increase of the aluminum nitride particles can be obtained. The reason for this is that, for the glass frit adhered to the surface of the aluminum nitride particles in the first step, the adhered position is physically fixed by the shaping step, whereby in the heat treatment step of the second step a uniform glass coating is formed.

As the apparatus used for the shaping step, a combination of a die which can form plates, bars, pellet shapes or the like, and a pressure press, or the like may be used. Further, it is possible to shape using various types of tablet press or the like, without any particular limitation.

The pressure when shaping is preferably in the range of 10 to 300 MPa, more preferably in the range of 50 to 150 MPa. In the case that the pressure when shaping is 10 MPa or more, a suitable shaped body can be formed, and in the case that it is 150 MPa or less, the aluminum nitride particles and the shaped body are not damaged.

Next, the third step is explained. The third step is a step of grinding the partially fused coated particles (glass frit). Specifically, for example, by the heat treatment of the second step, the glass frit melts, and coats the surface of the aluminum nitride particles. Then, the coated glass frit solidifies by cooling, and forms a glass phase where the coated particles partially fuse to each other. The glass-coated aluminum nitride particles, as described above, are obtained by grinding the partially fused coated particles.

The apparatus used in the above described grinding step is not particularly limited, and a general grinding device such as a roller mill, hammer mill, jet mill, ball mill and the like may be used.

Figure 2:
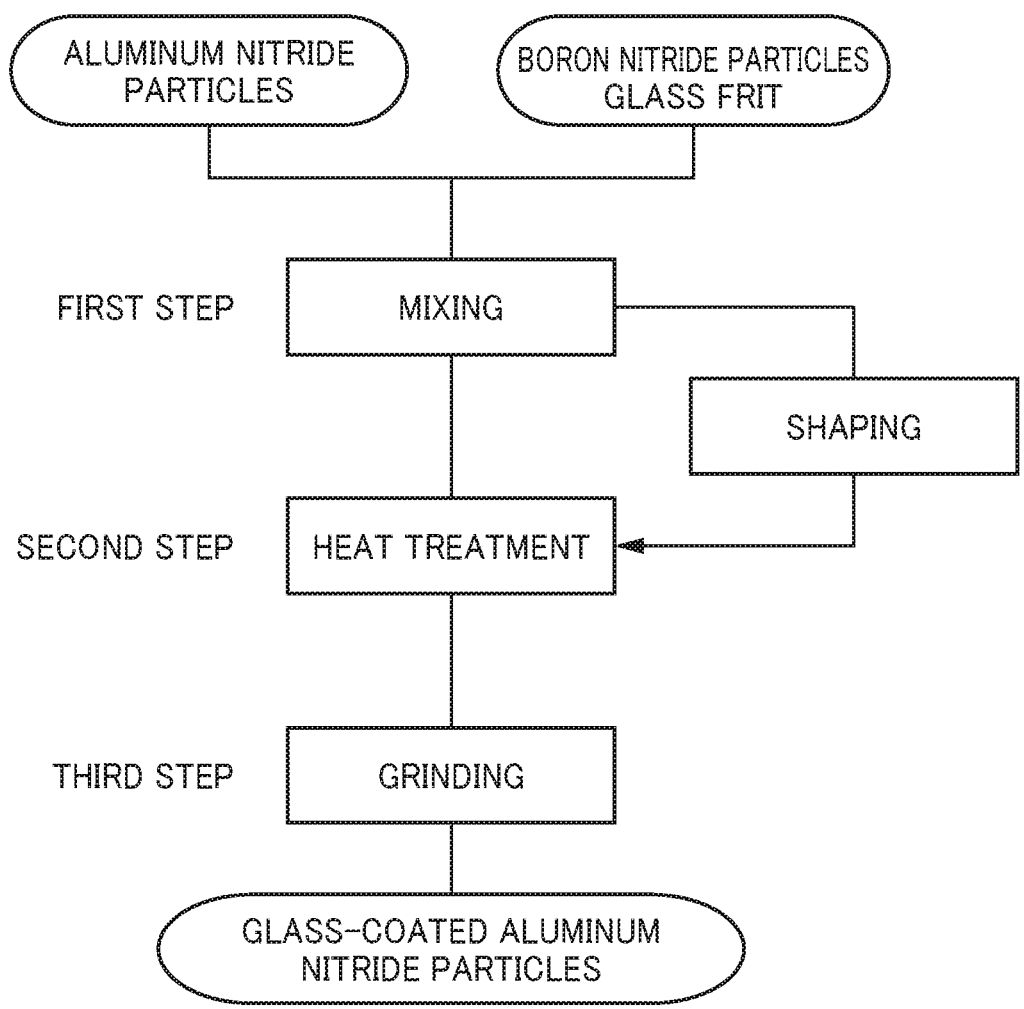
FIG. 2 is a flowchart showing the method for producing the glass-coated aluminum nitride particles according to an embodiment of the present invention.

Next, using FIG. 2, one mode of the method for producing the glass-coated aluminum nitride particles according to fourth aspect constituted of aluminum nitride particles, glass frit, and boron nitride particles is explained.

FIG. 2 is a flow chart of the method for producing the glass-coated aluminum nitride particles according to the present embodiment. The method for producing the glass-coated aluminum nitride particles has a first step of mixing the raw materials, a second step of heat treating the mixture, and a third step of grinding in order to obtain the glass-coated aluminum nitride particles.

First, the first step is explained. The first step is a step of mixing the raw materials of the aluminum nitride particles, the glass frit, and the boron nitride particles. In the first step of mixing the raw materials, care is taken so that the glass frit and the boron nitride particles is made to adhere as uniformly as possible to the surface of the aluminum nitride particles.

As a powder mixing device, it is possible to use a general powder mixing device. For example, a vessel rotation type V blender, a double cone type blender, a ribbon blender having a mixing blade, a screw type blender or the like, and furthermore, various types of particle compounding devices may be mentioned, and provided that it satisfies the objective of the mixing step, it is not particularly limited.

Further, the first step also includes a step of stably adhering the glass frit and the boron nitride particles to the aluminum nitride particle surface using a binder. The binder is preferably one which is burned in the later described heat treatment step of the second step, and which leaves no vestiges on the surface of the glass-coated aluminum nitride particles, and for example, a paraffin or the like may be used.

Further, the binder is not particularly limited, and for example, a paraffin such as a liquid paraffin or solid paraffin or the like with a weight average molecular weight of 200 to 600 may be used individually or in combinations of two types or more.

Next, the second step is explained. The second step is a step of carrying out a heat treatment of the mixture of the aluminum nitride particles, the glass frit, and the boron nitride particles. As the heat treatment oven for carrying out the heat treatment, a general heating oven can be used, provided that it is one which can maintain the mixture of the aluminum nitride particles, the glass frit, and the boron nitride particles at a temperature range set in advance.

The heat treatment is required to be carried out at the glass transition temperature of the glass frit or higher, and further, at a temperature of 2000° C. or lower which does not exceed the fusion point of the aluminum nitride particles. Further, as a result of considering the relationship between the heat treatment temperature and the moisture resistance of the coated particles, it was found that the moisture resistance of the coated particles is closely related to the heat treatment temperature.

Namely, from the relationship between the moisture resistance of the coated particles and the heat treatment temperature, it was found that when the heat treatment is carried out in a temperature range of 400° C. to 1400° C., a favorable moisture resistance of the coated particles can be obtained. The heat treatment time in this case is preferably in the range of 30 min to 3 hrs.

When the heat treatment temperature is in the range of 400° C. to 1400° C., by making the heat treatment time 30 min or more, it becomes possible to obtain a uniform coating film of the glass components on the surface of the aluminum nitride particles. Further, by making the heat treatment time 3 hrs or less, a production which attains increased manufacturing efficiency of the glass-coated aluminum nitride particles according to the fourth embodiment becomes possible.

Herein, the heat treatment of the second step may be carried out in air, but is preferably carried out in an atmosphere which does not include oxygen, such as in an inert gas or in a vacuum. The reason for this is that by preventing the oxidation of aluminum nitride, is it possible to avoid degeneration to alumina, which has poor thermal conductivity. Further, the atmosphere in the heat treatment is not particularly limited, but in consideration of economic efficiency, heat treatment in a nitrogen gas atmosphere is preferable.

Incidentally, the glass transition temperature has a value which differs depending on the measurement method and conditions. In the present embodiment, the glass transition temperature is defined, using Differential Thermal Analysis (DTA), by the first inflection point of the DTA chart. Specifically, it was measured using a differential thermal balance (Thermo plus EVO 2: manufactured by Rigaku Corporation).

Next, in the method for producing the glass-coated aluminum nitride particles according to the present embodiment, the case of including a shaping step between the first step and the second step is explained.

The shaping step is a step of applying pressure so as to uniformly coat the glass frit and the boron nitride particles onto the surface of the aluminum nitride particles. Specifically, for example, after the completion of the first step, the mixture of the aluminum nitride particles, the glass frit, and the boron nitride particles is shaped by a pressure of 10 to 300 MPa.

By the shaping step, it is possible to efficiently obtain a uniform glass coating on the aluminum nitride particle surface in the heat treatment step of the second step. Further, by carrying out the shaping step before the heat treatment, a uniform glass coating is formed, and the effect of a moisture resistance increase of the aluminum nitride particles can be obtained. The reason for this is that, for the glass frit adhered to the surface of the aluminum nitride particles in the first step, the adhered position is physically fixed by the shaping step, whereby in the heat treatment step of the second step a uniform glass coating is formed.

As the apparatus used for the shaping step, a combination of a die which can form plates, bars, pellet shapes or the like, and a pressure press, or the like may be used. Further, it is possible to shape using various types of tablet press or the like, without any particular limitation.

The pressure when shaping is preferably in the range of 10 to 300 MPa, more preferably in the range of 50 to 150 MPa. In the case that the pressure when shaping is 10 MPa or more, a suitable shaped body can be formed, and in the case that it is 150 MPa or less, the aluminum nitride particles, the boron nitride particles, and the shaped body are not damaged.

Next, the third step is explained. The third step is a step of grinding the partially fused coated particles (glass frit). Specifically, for example, by the heat treatment of the second step, the glass frit melts, and coats the surface of the aluminum nitride particles. Then, the coated glass frit solidifies by cooling, and forms a glass phase where the coated particles partially fuse to each other. The glass-coated aluminum nitride particles, as described above, are obtained by grinding the partially fused coated particles.

The apparatus used in the above described grinding step is not particularly limited, and a general grinding device such as a roller mill, hammer mill, jet mill, ball mill and the like may be used.

As explained above, the glass-coated aluminum nitride particles according to the present embodiment are excellent in moisture resistance while maintaining their original high thermal conductivity, and can be widely applied as a filler for heat dissipating material applications used in the electric•electronics fields.

[Heat Dissipating Resin Composition Comprising Glass-Coated Aluminum Nitride Particles]

The heat dissipating resin composition comprising the glass-coated aluminum nitride particles according to the fifth aspect of the present invention is explained below.

The glass-coated aluminum nitride particles according to the present embodiment can provide a heat dissipating resin composition by being added into a resin. Further, for the glass-coated aluminum nitride particles according to the present embodiment can also be added to a resin in combined use with commonly used fillers such as boron nitride, alumina, silica, zinc oxide and the like, to provide a heat dissipating resin composition.

A total content of the filler comprising the glass-coated aluminum nitride particles in the heat dissipating resin composition is preferably 50 to 95 vol %, more preferably 60 to 90 vol %, and even more preferably in the range of 70 to 90 vol %. In the case that the total content of the filler is 50 vol % or more, a favorable heat dissipation can be exhibited. Further, in the case that the total content of the filler is 95 vol, or less, a favorable workability can be obtained when using the heat dissipating resin.

The content of the glass-coated aluminum nitride particles is preferably 30 to 100 vol % of the total content of the filler, more preferably 40 to 100 vol %, and even more preferably in the range of 50 to 100 vol %. In the case that the total content of the filler is 30 vol % or more, a favorable heat dissipation can be exhibited.

The resin used in the heat dissipating resin composition is not particularly limited, but a thermosetting resin, a thermoplastic resin, a mixture of a thermosetting resin and a thermoplastic resin and the like, is preferable in the point of excellent heat resistance.

As the thermosetting resin, for example, there are an epoxy resin, phenol resin, bismaleimide resin, cyanate resin, urethane resin, silicone resin, (meth)acrylate-based resin, vinyl ester resin, unsaturated polyester resin, and the like, and these may be used individually or in combinations of two or more.

Further, a mixture to which a curing agent or curing accelerator for the thermosetting resin is added thereto may also be used. In particular, an epoxy resin is preferable in the point of good heat resistance, adhesive property, and electrical characteristics after curing, and a silicone resin is preferably in applications where serious consideration is given to heat resistance and flexible adhesion.

As the epoxy resin, there are a bifunctional glycidyl ether type epoxy resin, glycidyl ester type epoxy resin, linear aliphatic epoxy resin, heterocyclic epoxy resin, glycidyl amine type epoxy resin, polyfunctional glycidyl ether type epoxy resin and the like, and these may be used individually or in combinations of two types or more.

Specifically, for example, as the bifunctional glycidyl ether type epoxy resin, there is a bisphenol A type epoxy resin, bisphenol F type epoxy resin, bisphenol S type epoxy resin, hydrogenated bisphenol A type epoxy resin, biphenyl type epoxy resin and the like. Further, as the glycidyl ester type epoxy resin, there is a glycidyl ester hexahydrophthalate, glycidyl ester dimer acid and the like. Further, as the linear aliphatic epoxy resin, there is an epoxidized polybutadiene, an epoxidized soybean oil and the like. Further, as the heterocyclic epoxy resin, there is a triglycidyl isocyanate and the like. Furthermore, as the glycidyl amine type epoxy resin, there is N,N,N',N'-tetraglycidyl-4,4'-diaminodiphenylmethane, N,N,N',N'-tetraglycidyl-1,3-benzenedi(methaneamine), 4-(glycidyloxy)-N,N-diglycidylaniline, 3-(glycidyloxy)-N,N-diglycidylaniline and the like. Further, as the polyfunctional glycidyl ether type epoxy resin, there is a phenol novolak type epoxy resin, a cresol novolak type resin, a biphenyl aralkyl type epoxy resin, a naphthalene aralkyl type epoxy resin, a tetrafunctional naphthalene type epoxy resin, a triphenylmethane type epoxy resin, and the like.

The thermosetting resin, in the case of using an epoxy resin, may be blended with a curing agent or curing accelerant.

As the curing agent, for example, there are alicyclic acid anhydrides such as methyl tetrahydro phthalic anhydride, methyl hexahydro phthalic anhydride and himic anhydride and the like, aliphatic acid anhydrides such as dodecenyl succinic anhydride and the like, aromatic acid anhydrides such as phthalic anhydride, trimellitic anhydride and the like, bisphenols such as bisphenol A, bisphenol F, bisphenol S and the like, phenol resins such as phenol formaldehyde resin, phenol aralkyl resin, naphthol aralkyl resin, phenoldicyclopentadiene copolymer resin and the like, and organic dihydrazides such as dicyan diamide, adipic acid dihydrazide and the like.

Further, as the curing catalyst, for example, there are amines such as tris(dimethylaminomethyl)phenol, dimethylbenzylamine, 1,8-diazabicyclo(5,4,0)undecane and their derivatives, imidazols such as 2-methylimidazol, 2-ethyl-4-methylimidazol, and 2-phenylimidazol and the like and their derivatives.

The above described curing agents and curing catalyst can be used individually or in combinations of two or more.

To the heat dissipating resin composition according to the present embodiment, a flexibility imparting agent such as a silicone, urethane acrylate, butylal resin, acryl rubber, dienebased rubber and copolymers thereof and the like, a silane-based coupling agent, titanium-based coupling agent, inorganic ion supplementing agent, pigment, dye, diluent, solvent and the like may be suitably added as needed.

Further, the method for producing the heat dissipating resin composition is not particularly limited, and may be one where the glass-coated aluminum nitride particles, resin, and other additives are supplied to a dispersing•dissolving apparatus lumped together or dividedly, and mixed, dissolved and kneaded. As the dispersing•dissolving apparatus, for example a grinding apparatus, planetary mixer, rotating•revolving mixer, kneader, roll mill and the like may be used individually or in suitable combinations. Further, a method of mixing, dissolving and kneading while heating as required is also possible.

Next, the case of applying the heat dissipating resin composition according to the present embodiment to a heat dissipating sheet is explained below.

A heat dissipating sheet using the heat dissipating resin composition can be suitably used for bonding applications such as a semiconductor power devices, power modules and the like.

As the method for producing the heat dissipating sheet, there is a method of compression pressing or the like a heat dissipating resin composition in a form sandwiched on both faces by a base film, a method of coating the heat dissipating resin composition on a base film using a device such as a bar coater, screen press, blade coater, die coater, comma coater and the like. Then, the heat dissipating sheet after shaping and coating can additionally be subjected to a step of removing the solvent, a processing step of B staging by heating or the like, completely curing and the like.

As described above, because the combinations of suitable and required steps can be modified, various aspects of heat dissipating sheet can be obtained, and can be broadly implemented depending on the subject field of application and method of use.

In the case of having shaped or coated the heat dissipating resin composition on a base film, in order to improve the workability, it is possible to use a solvent. The solvent is not particularly limited, and a ketone based solvent of acetone, methyl ethyl ketone, methyl isobutyl ketone, cycloepentanone, cyclohexanone, an ether based solvent of 1,4-dioxane, tetrahydrofurane, diglyme, a glycol ether based solvent of methyl cellosolv, ethyl celosolv, propylene glycol monomethyl ether, propylene glycol monoethyl ether, propylene glycol monobutyl ether, propylene glycol monomethyl ether acetate, propylene glycol monoethyl ether acetate, diethylene glycol methyl ethyl ether, other benzyl alcohols, N-methyl pyrrolidone, γ-butyrolactone, ethyl acetate, N,N-dimethyl formamide and the like, may be used individually, or in combinations of two or more.

In the case that the heat dissipating sheet is formed from the heat dissipating resin composition, a sheet forming property which maintains the sheet form is required. The sheet forming property can be obtained by adding a high molecular weight component to the heat dissipating resin composition.

Specifically, for example, as the high molecular weight component there are a phenoxy resin, polyimide resin, polyamide resin, polycarbodimide resin, cyanate ester resin, (meth)acryl resin, polyester resin, polyethylene resin, polyethersulfone resin, polyetherimide resin, polyvinyl acetal resin, urethane resin, acryl rubber and the like.

In particular, the high molecular weight component, because of excellence in heat resistance and film formability, is preferably a phenoxy resin, polyimide resin, (meth)acryl resin, acryl rubber, cyanate ester resin, polycarbodimide resin and the like, and a phenoxy resin, polyimide resin, (meth)acryl resin and acryl rubber are more preferable. These may be used individually, or in mixtures of two or more, or as copolymers.

The molecular weight of the high molecular weight component is preferably a weight average molecular weight of 10,000 to 100,000, and more preferably in the range of 20,000 to 50,000. In the case of a weight average molecular weight as in the range described above, it is possible to maintain a sheet form with favorable handling characteristics.

The weight average molecular weight is a polystyrene-converted weight average molecular weight using gel permeation chromatography (GPC). Specifically, the weight average molecular weight can be measured by a combination of a column (Shodex (registered trademark) LF-804: manufactured by Showa Denko K.K.) and a differential refractometer Shodex (registered trademark) RI-71S: manufactured by Showa Denko K.K.).

The added amount of the high molecular weight component is not particularly limited, but in order to maintain the sheet form, is preferably 0.1 to 20 weight % with respect to the heat dissipating resin composition, more preferably 2 to 10 weight %. Further, when the added amount of the high molecular weight component is 0.1 to 20 weight %, the handling characteristics are good, and a favorable formability of the sheet, and formability of the membrane were obtained.

The base film used when producing the heat dissipating sheet is not particularly limited provided that it can withstand the processing conditions such as heating, drying and the like during production, and for example, there are a polyester film, polypropylene film, polyethylene terephthalate film, polyimide film, polyetherimide film, and the like.

As described above, the base film may be a multilayer film where two or more are combined, and may also be one which whose surface has been treated with a mold release agent such as one which is silicone based or the like. Further, the thickness of the base film is preferably 10 to 100 µm.

The thickness of the heat dissipating sheet formed on the base film s preferably 20 to 500 µm, and more preferably 50 to 200 µm. In the case that the thickness of the heat dissipating sheet is 20 µm or more, a heat dissipating sheet with a uniform composition is obtained, and in the case that it is 500 µm or less, a favorable heat dissipation property is obtained.

EXAMPLES

Below, the present invention is specifically explained by showing examples and comparative examples, but the present invention is not in any way limited to these examples.
(Glass-Coated Aluminum Nitride Particles of the First and Third Aspects)

First, the glass-coated aluminum nitride particles which are constituted of aluminum nitride particles and a glass phase are explained. The glass phase is one made by melting by a method set in advance, a glass frit covering at least a part of the surface of the aluminum nitride particles.
[Production of the Glass-Coated Aluminum Nitride Particles]

The raw materials of the aluminum nitride particles and the glass frit, and a paraffin as a binder were inserted into a polyethylene bag with the proportion of components set in advance.

The aluminum nitride particles and the glass frit were mixed in the parts by weight of the Examples 1 to 6 shown in Table 1 and the Comparative Example 2 of Table 2. Then, to the mixture of the aluminum nitride particles and the glass frit, as a paraffin, a liquid paraffin and a solid paraffin were added.

The liquid paraffin (weight average molecular weight 337) was added at 6 weight % with respect to the total amount of the aluminum nitride particles and the glass frit. The solid paraffin (weight average molecular weight 521) was added at 4 weight % with respect to the total amount of the aluminum nitride particles and the glass frit.

Herein, the aluminum nitride particles (AlN800RF: manufactured by ThruTek) were in the form of sintered granules with a volume cumulative d50 of 78 µm. The glass components of the glass frit (TMX-403SC: manufactured by Tokan Material Co., Ltd.) has a component ratio where $Al_2O_3$ is 10 to 20 weight %, CaO is 10 to 20 weight %, $B_2O_3$ is 10 to 20 weight, $SiO_2$ is 40 to 50 weight %, and BaO is 1 to 10 weight %. Further, the volume cumulative d50 of the glass frit is 2.4 µm, and the glass transition temperature is 674° C.

The mixing of the first step shown in FIG. 1 was implemented by shaking a polyethylene bag into which the above described blended components (aluminum nitride particles, glass frit, liquid paraffin, solid paraffin) by hand for 3 min.

Next, the shaping step shown in FIG. 1 was implemented for the Examples 1 to 5 of Table 1 and the Comparative Example 2 of Table 2. On the other hand, for Example 6 of Table 1, the shaping step was not implemented. The above described shaping step was performed by shaping using a chrome plated iron die with a circular hole opening with a diameter of 25 mm and a thickness of 50 mm, and using a compression press with conditions of normal temperature and 20 MPa. Then, a shaped object in pellet form with a diameter of 25 mm and a thickness of 5 mm was obtained.

Next, the heat treatment of the second step shown in FIG. 1 was implemented in a nitrogen gas atmosphere using a high temperature furnace. The heat treatment temperature was 1350° C., and the heat treatment time was 1 hr. Herein, the heat treatments were respectively implemented, for the pellets in the case of having implemented the shaping (Examples 1 to 5 of Table 1 and Comparative Example 2 of Table 2), and for the mixture after the first step in the case that the shaping was not implemented (Example 6 of Table 1). Further, as described above, the liquid paraffin and the solid paraffin used in the shaping step were burned away by the heat treatment.

Next, after the completion of the heat treatment, the grinding of the third step shown in FIG. 1 was implemented, and the glass-coated aluminum nitride particles were obtained. The grinding was carried out using a mortar for the Examples 1 to 6 of Table 1 and Comparative Example 2 of Table 2. Further, Comparative Example 1 of Table 2 is one where the aluminum nitride particles in the form of sintered granules used in the examples and comparative examples were untreated.

TABLE 1

| item | | | Example 1 | Example 2 | Example 3 | Example 4 | Example 5 | Example 6 |
|---|---|---|---|---|---|---|---|---|
| glass-coated aluminum nitride particles | composition (parts by weight) | aluminum nitride particles | 100.0 | 100.0 | 100.0 | 100.0 | 100.0 | 100.0 |
| | | glass frit | 0.1 | 0.5 | 1.0 | 3.0 | 5.0 | 1.0 |
| | production conditions | mixing | mixing by hand | mixing by hand | mixing by hand | mixing by hand | mixing by hand | mixing by hand |
| | | shaping | yes | yes | yes | yes | yes | no |
| | | heat treatment temperature (° C.) | 1350 | 1350 | 1350 | 1350 | 1350 | 1350 |
| | | heat treatment time (h) | 1 | 1 | 1 | 1 | 1 | 1 |
| | characteristics | coating thickness (µm)[*1] | 0.01 | 0.07 | 0.13 | 0.40 | 0.66 | 0.13 |
| | | volume cumulative d50 (µm) | 78 | 79 | 80 | 81 | 83 | 79 |
| | | moisture resistance ammonia concentration (mg/L) | 88 | 42 | 30 | 53 | 93 | 62 |

TABLE 1-continued

| | item | | Example 1 | Example 2 | Example 3 | Example 4 | Example 5 | Example 6 |
|---|---|---|---|---|---|---|---|---|
| resin formed body | composition (parts by weight) | glass-coated aluminum nitride particles | — | 100.0 | 100.0 | 100.0 | 100.0 | — |
| | | alumina filler | — | 50.0 | 50.0 | 50.0 | 50.0 | — |
| | | epoxy resin | — | 11.1 | 11.1 | 11.1 | 11.1 | — |
| | | high molecular weight component | — | 1.2 | 1.2 | 1.2 | 1.2 | — |
| | | curing agent | — | 0.1 | 0.1 | 0.1 | 0.1 | — |
| | filler (volume %) | total filler amount[*2] | — | 80.5 | 80.5 | 80.5 | 80.5 | — |
| | characteristics | thermal conductivity (W/m/K) | — | 13.7 | 13.5 | 12.3 | 11.4 | — |

[*1] calculated value
[*2] total amount of glass-coated aluminum nitride particles and alumina filler

TABLE 2

| | item | | Comparative Example 1 | Reference Example 2 |
|---|---|---|---|---|
| glass-coated aluminum nitride particles | composition (parts by weight) | aluminum nitride particles | 100.0 | 100.0 |
| | | glass frit | — | 8.0 |
| | production conditions | mixing | | mixing by hand |
| | | shaping | | yes |
| | | heat treatment temperature (° C.) | | 1350 |
| | | heat treatment time (h) | | 1 |
| | characteristics | coating thickness (μm)[*1] | | 1.04 |
| | | volume cumulative d50 (μm) | 78 | 85 |
| | | moisture resistance ammonia concentration (mg/L) | 357 | 186 |
| resin formed body | composition (parts by weight) | glass-coated aluminum nitride particles | 100.0 | 100.0 |
| | | alumina filler | 50.0 | 50.0 |
| | | epoxy resin | 11.1 | 11.1 |
| | | high molecular weight component | 1.2 | 1.2 |
| | | curing agent | 0.1 | 0.1 |
| | filler (volume %) | total filler amount [*2] | 80.5 | 80.5 |
| | characteristics | thermal conductivity (W/m/K) | 14.0 | 10.6 |

[*1] calculated value
[*2] total amount of glass-coated aluminum nitride particles and alumina filler

[Characterization of the Glass-Coated Aluminum Nitride Particles]

Next, the characterization of the glass-coated aluminum nitride particles is explained.

For the average diameter, using a laser diffraction-scattering-type particle diameter distribution measurement device (Microtrac MT3300EX2: manufactured by MicrotracBEL Corp.), the volume cumulative d50 which is the particle diameter where the measured volume value becomes 50 was obtained.

The moisture resistance evaluation of the glass-coated aluminum nitride particles was measured by charging 3 g of the glass-coated aluminum nitride particles and 17 g of a hydrochloric acid aqueous solution adjusted to a pH of 4 into a 50 ml sample tube, shaking under conditions of 40° C., 80 rpm and 2 hrs in a shaking type high temperature oven, and the ammonia concentration of the supernatant fluid after standing was measured using an ammonia electrode (Ammonia electrode 5002A: manufactured by Horiba Ltd.). Table 1 and Table 2 show the results of the characterization of the glass-coated aluminum nitride particles of the examples and comparative examples.

[Production of Resin Formed Body]

Next, the processes of producing and working the resin formed body are explained.

The raw material of the resin formed body is the glass-coated aluminum nitride particles of Examples 2 to 5 of Table 1 and Comparative Example 2 of Table 2, the aluminum nitride particles of Comparative Example 1 of Table 2, a spherical shaped alumina filler (Alumina Beads (registered trademark) CB-P05: manufactured by Showa Denko K.K.) with a volume cumulative d50 of 5 μm, an epoxy resin, a high molecular weight component, and a curing agent.

The epoxy component is a bisphenol A type epoxy resin (YD 128: manufactured NIPPON STEEL & SUMIKIN Chemical & Material Co., Ltd.) with an epoxy equivalence of 189. The high molecular weight component is a bisphenol A type phenoxy resin (YD-50S: manufactured by NIPPON STEEL & SUMIKIN Chemical & Material Co., Ltd.) with a polystyrene converted weight average molecular weight of 40,000, in a 30 weight % solution of 1-methoxy-2-propanol (solvent). The curing agent is 2-ethyl-4-methylimidazol (2E4MZ: manufactured by Shikoku Kasei Kögyö K.K.).

The resin formed body was obtained by the procedures described later, by mixing the above described raw materials in the weight ratios shown in Tables 1 and 2.

As the production steps of the resin formed body, first the epoxy component, high molecular weight component, and curing agent were mixed in a plastic vessel in the weight ratios shown in Table 1 and Table 2, and a mixture was prepared using a revolving rotating mixer under conditions of 2,000 rpm for 2 min.

Next, the glass-coated aluminum nitride particles of the examples or comparative examples (however, aluminum nitride particles in Comparative Example 1) and the alumina filler were added to the plastic vessel in the weight ratios of Table 1 and Table 2, and mixed using a revolving rotating mixer under conditions of 2,000 rpm for 3 min.

The mixture was removed to a stainless steel vat, and using a vacuum vessel, the solvent was volatilized under conditions of 50° C. and 15 min, and a heat dissipating resin composition was obtained.

Further, the coating thickness is the calculated value computed from the added amount of the glass frit with respect to the average particle diameter of the aluminum nitride particles used in the examples and comparative examples.

The forming of the resin formed body of the examples and comparative examples was carried out using a heat press device. The resin formed body was obtained by mounting, on a stainless steel plate on which a film of die-release treated polyethylene terephthalate (below referred to as PET) was disposed, a PET mold having a hole with a diameter of 30 mm and a thickness of 0.4 mm, placing the heat dissipating resin composition inside the mold, sandwiching with a PET film whose upper surface was die-release treated and a stainless steel plate, and forming and curing using a heat press device under conditions of 5 MPa, 120° C., and 30 min.

[Measurement of the Thermal Conductivity]

For the thermal conductivity of the thickness direction of the resin formed body, for the resin formed bodies obtained in the examples and comparative examples, the thermal diffusivity was measured using a laser flash method thermal diffusivity measurement apparatus (LFA447 NanoFlash: manufactured by NETZSCH), and the measured result was computed by multiplying by the theoretical values of the specific heat and density of the respective resin formed bodies.

As the sample used for the thermal diffusivity measurement, a size of 10 mm×10 mm was removed, and after applying a gold coating to both faces using an ion coater (IB-3: manufactured by Eicoh Co., Ltd.), and further both sides were graphite coated.

Further, the specific heat of the resin formed body of each example and comparative examples was calculated taking a theoretical specific heat of 0.72 for of the aluminum nitride particles, a theoretical specific heat of 0.78 for the alumina filler, and a theoretical specific heat of 1.80 for the resin component. Further, the density of the resin formed body of the examples and comparative examples was calculated by taking a theoretical density of 3.40 g/cm$^3$ for the aluminum nitride particles, a theoretical density of 3.95 g/cm$^3$ for the alumina filler, and a theoretical density of 1.18 g/cm$^3$ for the resin component.

The evaluation results for the thermal conductivity of the resin formed bodies of the examples and comparative examples are shown in Table 1 and Table 2. The thermal conductivity evaluation was carried out as a resin formed body comprising the glass-coated aluminum nitride particles.

The results are shown in Table 1 and Table 2. The Examples 2 to 5 of Table 1 using the glass-coated aluminum nitride particles showed an 80% or more favorable thermal conductivity, compared to the Comparative Example 1 of Table 2 using aluminum nitride particles without a glass coating. In particular, Example 2 and Example 3 of Table 1 which had a small amount of the glass coating, showed a thermal conductivity of 95% or more higher than the Comparative Example 1 of Table 2.

Figure 3:
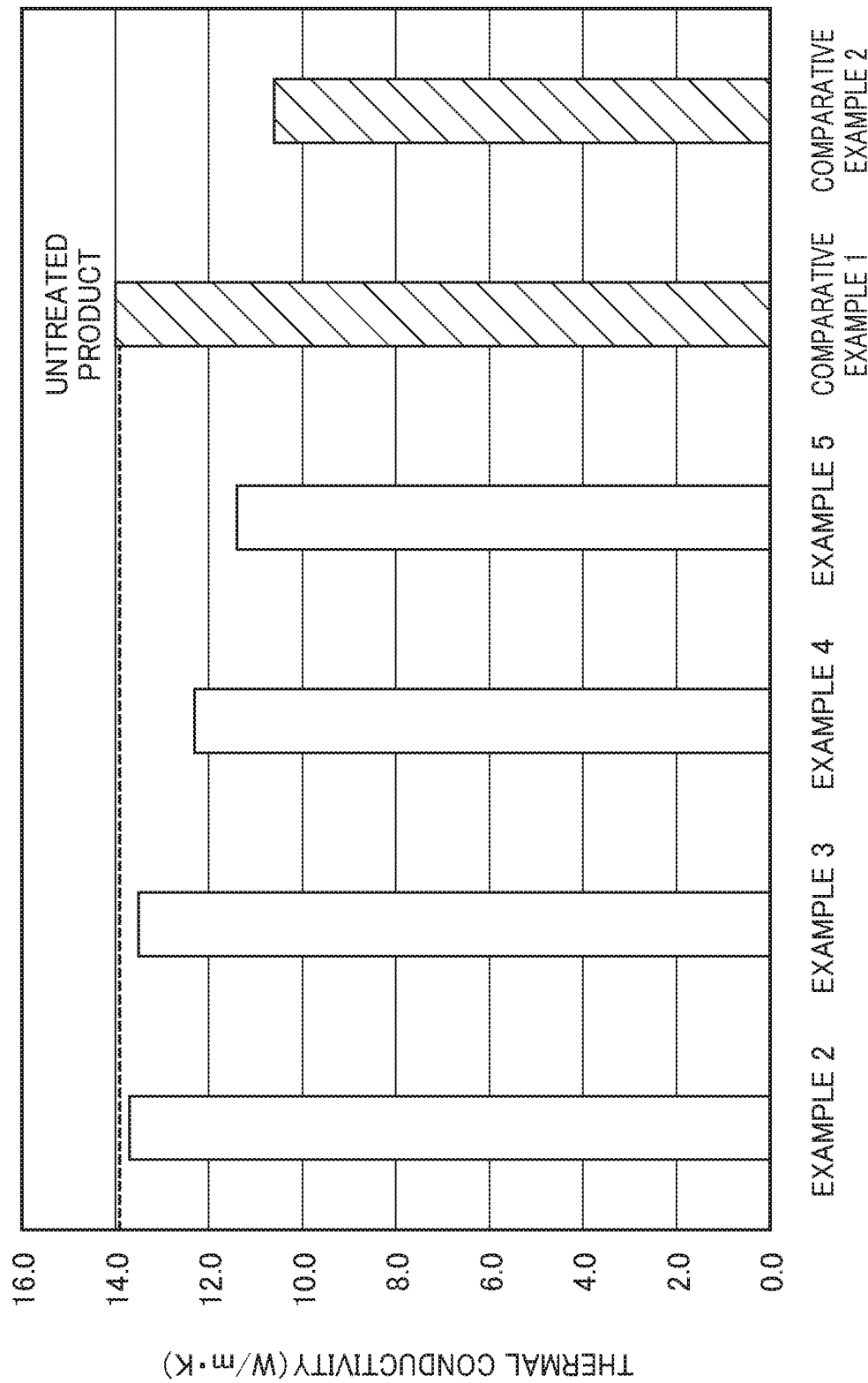
FIG. 3 is a figure showing the evaluation results relating to the thermal conductivity of the glass-coated aluminum nitride particles according to an embodiment of the present invention.

FIG. 3 is a figure showing the evaluation results relating to the thermal conductivity of the glass-coated aluminum nitride particles according to the present embodiment.

As shown in Table 1 and Table 2, the moisture resistance of the moisture resistance of the glass-coated aluminum nitride particles of Examples 1 to 6 of Table 1 where a composition comprising the glass component (glass frit) in a ratio of 0.1 to 5.0 parts by weight with respect to the aluminum nitride particles all showed a favorable value of an ammonia concentration of 100 mg/L or less, compared to an ammonia concentration of 357 mg/L of the uncoated aluminum nitride particles (Comparative Example 1 of Table 2).

In particular, Examples 2 to 4 of Table 1 which where the aluminum nitride particles were coated with a ratio of 0.5 to 3.0 parts by weight of the composition comprising the glass component (glass frit), attained a greatly reduced value of the ammonia concentration.

On the other hand, for Comparative Example 2 of Table 2 which had a large amount of the comprising the glass component (glass frit), the level was unfavorable compared to the Examples. From the results of the electron microscopy observation, peeling of the glass coating of Comparative Example 2 of Table 2 was observed.

It is conjectured that because the glass coating thickness of Comparative Example 2 of Table 2 became thick, this caused the phenomenon that at the same time that the glass coated particles were being separated in the grinding step, the glass coating itself was peeling off. Namely, it is understood that the glass coating thickness requires a suitable thickness. Further, concerning the difference in the presence or absence of the shaping step, from a comparison of Example 3 (present) and Example 6 (absent) of Table 1, the moisture resistance increasing effect of Example 3 which was underwent the shaping step was more notable.

Figure 4:
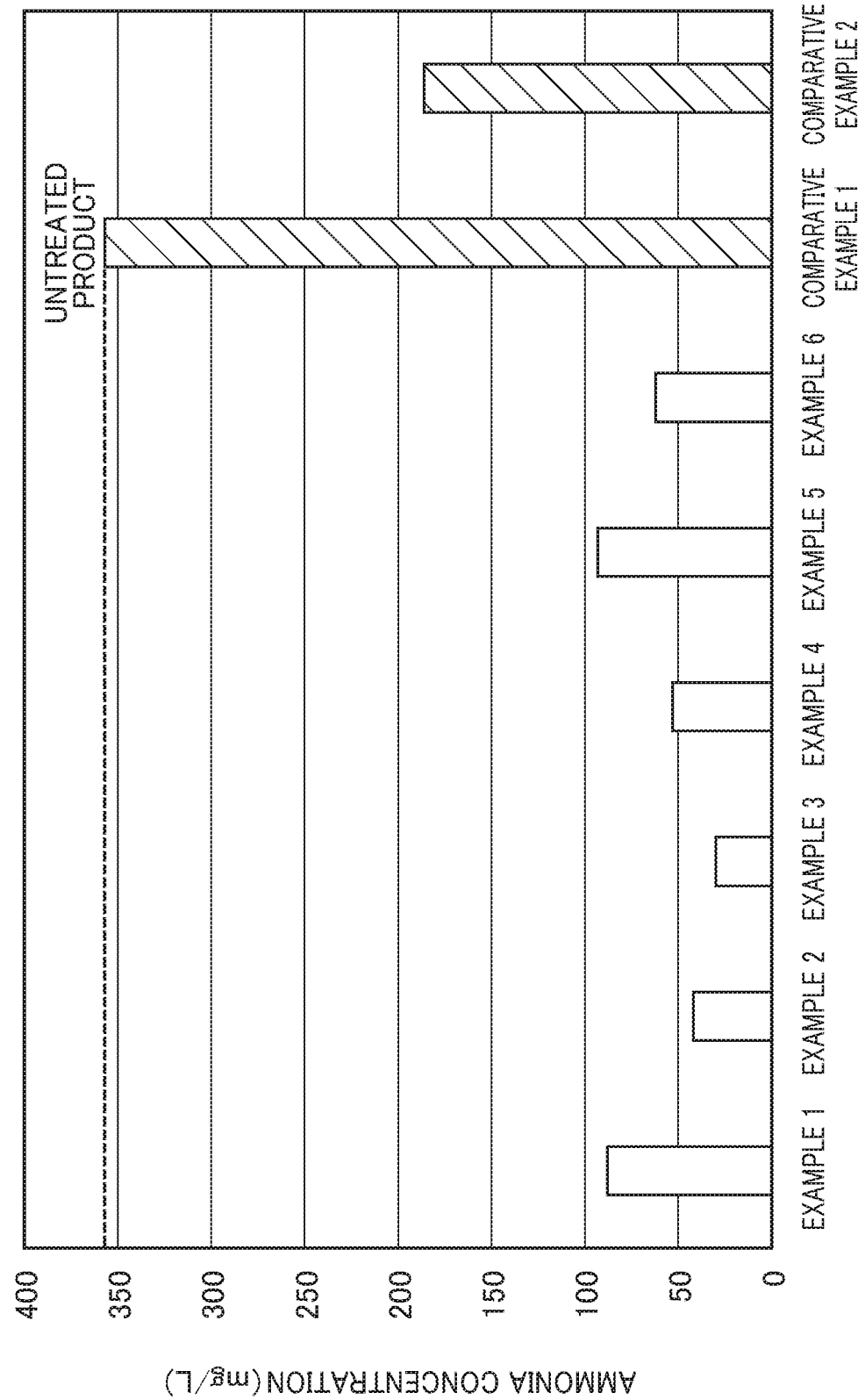
FIG. 4 is a figure showing the evaluation results relating to the moisture resistance of the glass-coated aluminum nitride particles according to an embodiment of the present invention.

FIG. 4 is a figure showing the evaluation results relating to the moisture resistance of the glass-coated aluminum nitride particles according to the present embodiment. From the results of FIG. 3 and FIG. 4, by using the glass-coated aluminum nitride particles according to the present embodiment, it is possible to attain increased moisture resistance while maintaining a high thermal conductivity.

(Glass-Coated Aluminum Nitride Particles of the Second and Fourth Aspects)

Next, the glass-coated aluminum nitride particles constituted of the aluminum nitride particles, glass frit, and boron nitride particles are explained.

[Production of the Glass-Coated Aluminum Nitride Particles]

The raw materials of the aluminum nitride particles, the glass frit, and the boron nitride particles, and a paraffin as a binder were inserted into a polyethylene bag with the proportion of components set in advance.

The aluminum nitride particles, the glass frit, and the boron nitride particles were mixed in the parts by weight of the Examples 7 to 11 shown in Table 3 and the Reference Example 4 of Table 4. Then, to the mixture of the aluminum nitride particles and the glass frit, as a paraffin, a liquid paraffin and a solid paraffin were added.

The liquid paraffin (weight average molecular weight 337) was added at 6 weight % with respect to the total amount of the aluminum nitride particles, the glass frit, and the boron nitride. The solid paraffin (weight average molecular weight 521) was added at 4 weight % with respect to the total amount of the aluminum nitride particles, the glass frit, and the boron nitride.

Herein, the aluminum nitride particles (AlN800RF: manufactured by ThruTek) are in the form of sintered granules with a volume cumulative d50 of 78 μm.

The glass components of the glass frit 1 (TMX-403SC: manufactured by Tokan Material Co., Ltd.) has a component ratio where $Al_2O_3$ is 10 to 20 weight %, CaO is 10 to 20 weight %, $B_2O_3$ is 10 to 20 weight %, $SiO_2$ is 40 to 50 weight %, and BaO is 1 to 10 weight %. Further, the volume cumulative d50 of the glass frit is 2.4 μm, and the glass transition temperature is 674° C. The glass frit 2 (TMX-403J: manufactured by Tokan Material Co., Ltd.) has a volume cumulative d50 of 5.1 μm, and the glass components and the glass transition temperature were the same as the glass frit 1.

The boron nitride particles (SHOBN (registered trademark) UHP-2: manufactured by Showa Denko K.K.), have a volume cumulative d50 of 10.4 μm.

The mixing of the first step shown in FIG. 1 was implemented by shaking a polyethylene bag into which the above described blended components (aluminum nitride particles, glass frit 1, glass frit 2, boron nitride particles, liquid paraffin, solid paraffin) by hand for 3 min.

Next, the shaping step shown in FIG. 2 was implemented for the Examples 10 to 11 of Table 3 and the Reference Example 4 of Table 4. On the other hand, for Examples 7 to 9 of Table 3, the shaping step was not implemented. The shaping step was performed by shaping using a chrome plated iron die with a circular hole opening with a diameter of 25 mm and a thickness of 50 mm, by shaping using a compression press with conditions of normal temperature and 20 MPa. Then, a shaped object in pellet form with a diameter of 25 mm and a thickness of 5 mm was obtained.

Next, the heat treatment of the second step shown in FIG. 2 was implemented in a nitrogen gas atmosphere. The heat treatment temperature was 1350° C., and the heat treatment time was 1 hr.

Herein, the heat treatments were respectively implemented, for the pellets in the case of implementing the shaping (Examples 10 to 11 of Table 3 and Reference Example 4 of Table 4), and for the mixture after the first step, inserted into an alumina crucible, in the case that the shaping was not implemented (Examples 7 to 9 of Table 3). Further, as described above, the liquid paraffin and the solid paraffin used in the shaping step were burned away by the heat treatment.

Next, after the completion of the heat treatment, the grinding of the third step shown in FIG. 2 was implemented, and the glass-coated aluminum nitride particles were obtained. The grinding was carried out using a mortar for the Examples 7 to 11 of Table 3 and Reference Example 4 of Table 4.

Further, Comparative Example 3 of Table 4 is one where the aluminum nitride particles in the form of sintered granules used in the examples and comparative examples were untreated.

TABLE 3

| item | | | Example 7 | Example 8 | Example 9 | Example 10 | Example 11 |
|---|---|---|---|---|---|---|---|
| glass-coated aluminum nitride particles | composition (parts by weight) | aluminum nitride particles | 100.0 | 100.0 | 100.0 | 100.0 | 100.0 |
| | | boron nitride particles | 2.0 | 2.0 | 2.0 | 2.0 | 2.0 |
| | | glass frit 1 | 0.0 | 0.0 | 1.0 | 0.0 | 1.0 |
| | | glass frit 2 | 2.0 | 1.0 | 0.0 | 1.0 | 0.0 |
| | | composition comprising glass component[*2] | 4.0 | 3.0 | 3.0 | 3.0 | 3.0 |
| | raw material particle size (μm)[*1] | boron nitride particles | 10.4 | 10.4 | 10.4 | 10.4 | 10.4 |
| | | glass frit | 5.1 | 5.1 | 2.4 | 5.1 | 2.4 |
| | production conditions | mixing | mixing by hand | mixing by hand | mixing by hand | mixing by hand | mixing by hand |
| | | shaping | no | no | no | yes | yes |
| | | heat treatment temperature (° C.) | 1350 | 1350 | 1350 | 1350 | 1350 |
| | | heat treatment time (h) | 1 | 1 | 1 | 1 | 1 |
| | characteristics | volume cumulative d50 (μm) | 85 | 80 | 84 | 81 | 83 |
| | | moisture resistance ammonia concentration (mg/L) | 14 | 15 | 11 | 12 | 10 |
| resin formed body | composition (parts by weight) | glass-coated aluminum nitride particles | 100.0 | 100.0 | 100.0 | 100.0 | 100.0 |
| | | alumina filler | 50.0 | 50.0 | 50.0 | 50.0 | 50.0 |
| | | epoxy resin | 11.1 | 11.1 | 11.1 | 11.1 | 11.1 |
| | | high molecular weight component | 1.2 | 1.2 | 1.2 | 1.2 | 1.2 |
| | | curing agent | 0.1 | 0.1 | 0.1 | 0.1 | 0.1 |
| | filler (volume %) | total filler amount[*3] | 80.5 | 80.5 | 80.5 | 80.5 | 80.5 |
| | characteristics | thermal conductivity (W/m/K) | 11.1 | 11.2 | 11.8 | 11.5 | 11.6 |

[*1]volume cumulative d50
[*2]total amount of glass-coated aluminum nitride particles and glass frit
[*3]total amount of glass-coated aluminum nitride particles and alumina filler

TABLE 4

| item | | | Comparative Example 3 | Reference Example 4 |
|---|---|---|---|---|
| glass-coated aluminum nitride particles | composition (parts by weight) | aluminum nitride particles | 100.0 | 100.0 |
| | | boron nitride particles | | 0.0 |
| | | glass frit 1 | | 1.0 |
| | | glass frit 2 | | 0.0 |
| | | composition comprising glass component *2 | | 1.0 |
| | raw material particle size (μm)*1 | boron nitride particles | | |
| | | glass frit | | 2.4 |
| | production conditions | mixing | | mixing by hand |
| | | shaping | | yes |
| | | heat treatment temperature (° C.) | | 1350 |
| | | heat treatment time (h) | | 1 |
| | characteristics | volume cumulative d50 (μm) | 78 | 80 |
| | | moisture resistance ammonia concentration (mg/L) | 357 | 30 |
| resin formed body | composition (parts by weight) | glass-coated aluminum nitride particles | 100.0 | 100.0 |
| | | alumina filler | 50.0 | 50.0 |
| | | epoxy resin | 11.1 | 11.1 |
| | | high molecular weight component | 1.2 | 1.2 |
| | | curing agent | 0.1 | 0.1 |
| | filler (volume %) | total filler amount *3 | 80.5 | 80.5 |
| | characteristics | thermal conductivity (W/m/K) | 14.0 | 13.5 |

*1 volume cumulative d50
*2 total amount of glass-coated aluminum nitride particles and glass frit
*3 total amount of glass-coated aluminum nitride particles and alumina filler

[Characterization of the Glass-Coated Aluminum Nitride Particles]

Next, the characterization of the glass-coated aluminum nitride particles is explained.

For the average diameter, using a laser diffraction-scattering-type particle diameter distribution measurement device (Microtrac MT3300EX2: manufactured by MicrotracBEL Corp.), the volume cumulative d50 which is the particle diameter where the measured volume value becomes 50% was obtained.

The moisture resistance evaluation of the glass-coated aluminum nitride particles was measured by charging 3 g of the glass-coated aluminum nitride particles and 17 g of a hydrochloric acid aqueous solution adjusted to a pH of 4 into a 50 ml sample tube, shaking under conditions of 40° C., 80 rpm and 2 hrs in a shaking type high temperature oven, and the ammonia concentration of the supernatant fluid after standing was measured using an ammonia electrode (Ammonia electrode 5002A: manufactured by Horiba Ltd.). Table 3 and Table 4 show the results of the characterization of the glass-coated aluminum nitride particles of the examples and comparative examples.

[Production of Resin Formed Body]

Next, the processes of producing and working the resin formed body are explained.

The raw material of the resin formed body is the glass-coated aluminum nitride particles of Examples 7 to 11 of Table 3 and Reference Example 4 of Table 4, the aluminum nitride particles of Comparative Example 3 of Table 4, a spherical shaped alumina filler (Alumina Beads (registered trademark) CB-P05: manufactured by Showa Denko K.K.) with a volume cumulative d50 of 5 μm, an epoxy resin, a high molecular weight component, and a curing agent.

The epoxy component is a bisphenol A type epoxy resin (YD 128: manufactured NIPPON STEEL & SUMIKIN Chemical & Material Co., Ltd.) with an epoxy equivalence of 189. The high molecular weight component is a bisphenol A type phenoxy resin (YD-50S: manufactured by NIPPON STEEL & SUMIKIN Chemical & Material Co., Ltd.) with a polystyrene converted weight average molecular weight of 40,000, in a 30 weight % solution of 1-methoxy-2-propanol (solvent). The curing agent is 2-ethyl-4-methylimidazol (2E4MZ: manufactured by Shikoku Kasei Kögyö K.K.).

The resin formed body was obtained by the procedures described later, by mixing the above described raw materials in the weight ratios shown in Tables 3 and 4.

As the production steps of the resin formed body, first the epoxy component, high molecular weight component, and curing agent are mixed in a plastic vessel in the weight ratios shown in Table 3 and Table 4, and a mixture is prepared using a revolving rotating mixer under conditions of 2,000 rpm for 2 min.

Next, the glass-coated aluminum nitride particles of the examples or comparative examples (however, aluminum nitride particles in Comparative Example 3) and the alumina filler are added to the plastic vessel in the weight ratios of Table 3 and Table 4, and mixed using a revolving rotating mixer under conditions of 2,000 rpm for 3 min.

The mixture was removed to a stainless steel vat, and using a vacuum vessel, the solvent was volatilized under conditions of 50° C. and 15 min, and a heat dissipating resin composition was obtained.

Further, the coating thickness is the calculated value computed from the added amount of the glass frit with respect to the average particle diameter of the aluminum nitride particles used in the examples and comparative examples.

The forming of the resin formed body of the examples and comparative examples was carried out using a heat press device. The resin formed body was obtained by mounting, on a stainless steel plate on which a film of die-release treated polyethylene terephthalate (below referred to as PET) was disposed, a PET mold having a hole with a diameter of 30 mm and a thickness of 0.4 mm, placing the heat dissipating resin composition inside the mold, sandwiching with a PET film whose upper surface was die-release treated and a stainless steel plate, and forming and curing using a heat press device under conditions of 5 MPa, 120° C., and 30 min.

[Measurement of the Thermal Conductivity]

For the thermal conductivity of the thickness direction of the resin formed body, for the resin formed bodies obtained in the examples and comparative examples, the thermal diffusivity was measured using a laser flash method thermal diffusivity measurement apparatus (LFA447 NanoFlash: manufactured by NETZSCH), and the measured result was computed by multiplying by the theoretical values of the specific heat and density of the respective resin formed bodies.

As the sample used for the thermal diffusivity measurement, a size of 10 mm×10 mm was removed, and after applying a gold coating to both faces using an ion coater (IB-3: manufactured by Eicoh Co., Ltd.), and further both sides were graphite coated.

Further, the specific heat of the resin formed body of each example and comparative example, was calculated taking a theoretical specific heat of 0.73 for of the aluminum nitride particles, a theoretical specific heat of 0.83 for the alumina filler, a theoretical specific heat of 0.80 for the boron nitride particles, and a theoretical specific heat of 1.80 for the resin component. Further, the density of the resin formed body of the examples and comparative examples was calculated by taking a theoretical density of 3.26 $g/cm^3$ for the aluminum nitride particles, a theoretical density of 2.27 $g/cm^3$ for the boron nitride particles, a theoretical density of 3.94 $g/cm^3$ for the alumina filler, and a theoretical density of 1.17 $g/cm^3$ for the resin component.

The evaluation results for the thermal conductivity of the resin formed bodies of the examples and comparative examples are shown in Table 3 and Table 4. The thermal conductivity evaluation was carried out as a resin formed body comprising the glass-coated aluminum nitride particles. The results are shown in Table 3 and Table 4.

The examples 7 to 11 of Table 3 using the glass-coated aluminum nitride particles, showed a favorable thermal conductivity exceeding 10 W/m·K of 80 to 85% compared to the Comparative Example 3 of Table 4 using aluminum nitride particles without a glass coating.

Figure 5:
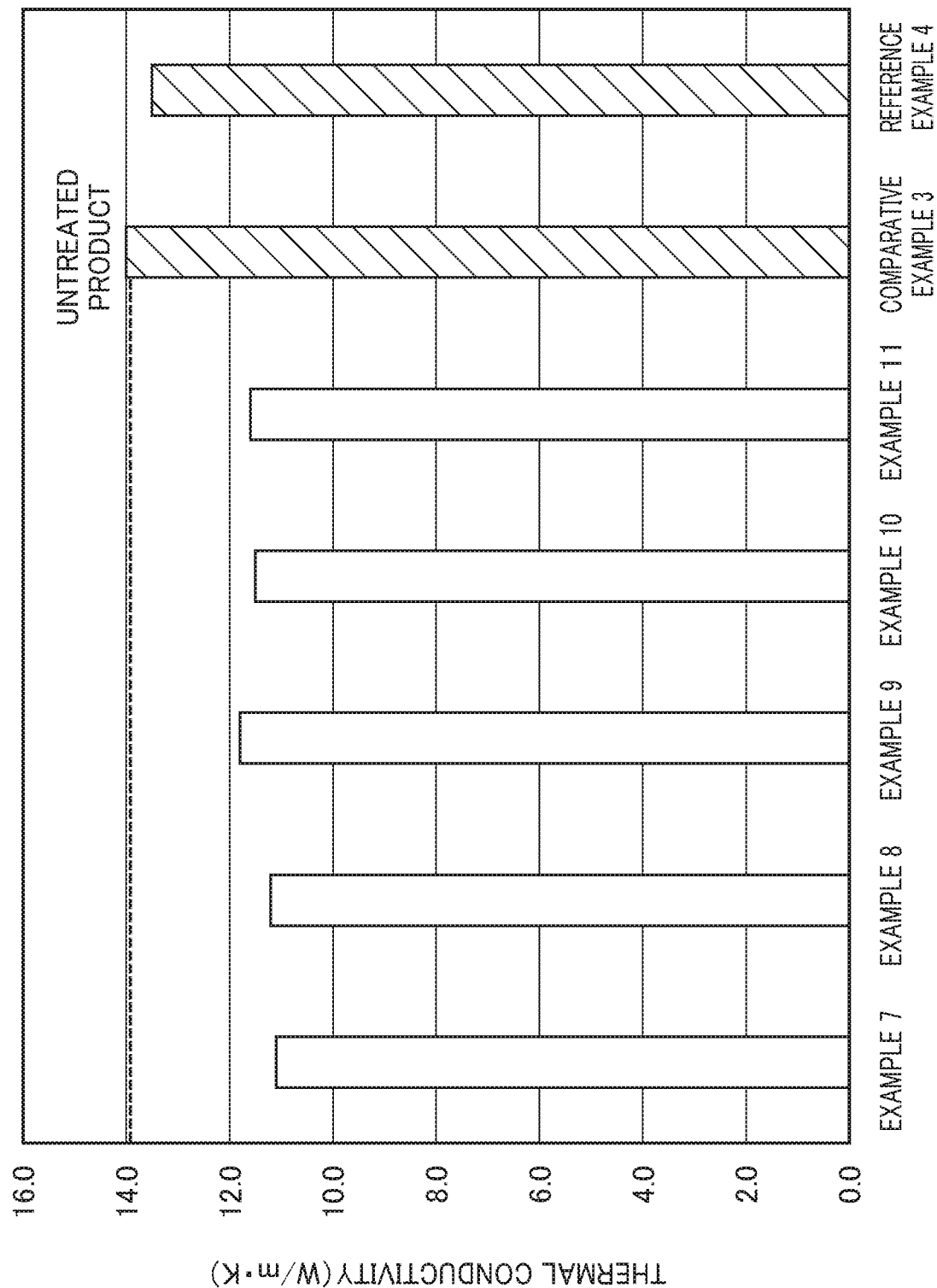
FIG. 5 is a figure showing the evaluation results relating to the thermal conductivity of the glass-coated aluminum nitride particles according to an embodiment of the present invention.

FIG. 5 is a figure showing the evaluation results relating to the thermal conductivity of the glass-coated aluminum nitride particles according to the present embodiment.

As shown in Table 3 and Table 4, the moisture resistance of the glass-coated aluminum nitride particles of Examples 7 to 11 of Table 3 where a composition comprising the glass component (total amount of glass frit and boron nitride particles) was coated on the aluminum nitride particles in a ratio of 3.0 to 4.0 parts by weight with respect to 100 parts by weight of the aluminum nitride particles, all showed a favorable value of an ammonia concentration of 15 mg/L or less, compared to an ammonia concentration of 357 mg/L of the uncoated aluminum nitride particles (Comparative Example 3 of Table 4).

On the other hand, in the case of not including the boron nitride particles (Reference Example 4 of Table 4), an improvement of the moisture resistance by the glass coating can be recognized. However, the improvement in the moisture resistance by the glass coating was not particularly remarkable compared to the Examples of Table 3.

From the results of the electron microscopy observation of the glass-coated aluminum nitride particles, peeling of the a part of the glass coating of Reference Example 4 of Table 4 was observed. The peeling of the glass coating in Reference Example 4 of Table 4 is inferred to be that because boron nitride particles, which are the starting point of the grinding, are not included, fracturing does not necessarily occur among the coated particles.

Figure 6:
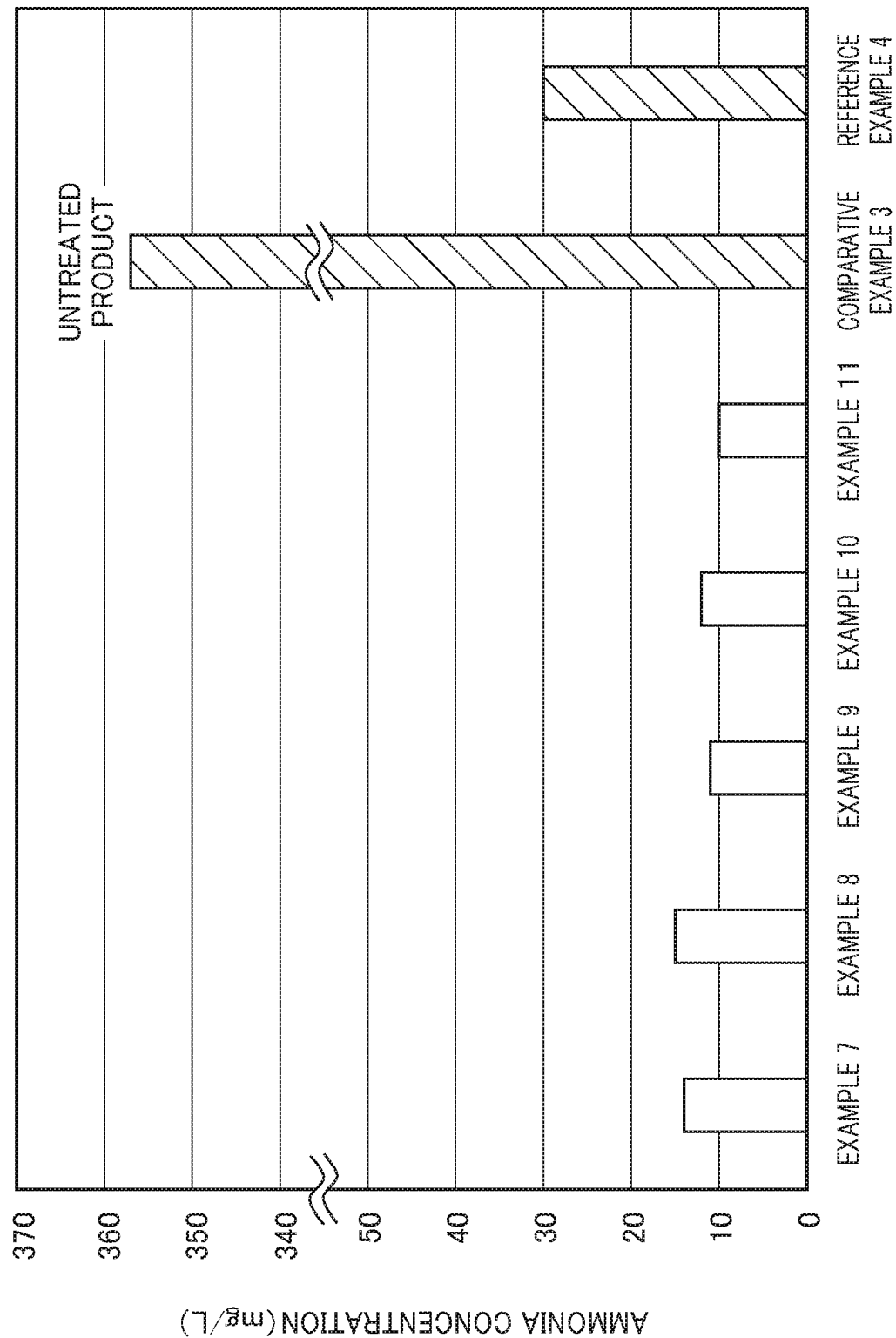
FIG. 6 is a figure showing the evaluation results relating to the moisture resistance of the glass-coated aluminum nitride particles according to an embodiment of the present invention.

FIG. 6 is a figure showing the evaluation results relating to the moisture resistance of the glass-coated aluminum nitride particles according to the present embodiment. From the results of FIG. 5 and FIG. 6, if the glass-coated aluminum nitride particles according to the present embodiment are used, it is possible to attain increased moisture resistance while maintaining a high thermal conductivity.

The invention claimed is:

1. Glass-coated aluminum nitride particles comprising aluminum nitride particles, and
   a glass phase covering at least a part of a surface of the aluminum nitride particles,
   wherein
   the glass phase is a composition comprising at least a glass component, and the composition comprising the glass component has a ratio of 0.2 parts by weight to 5.0 parts by weight with respect to 100 parts by weight of the aluminum nitride particles, and the composition comprising the glass component further comprises boron nitride particles, and the aluminum nitride particles have a volume cumulative d50 of 10 μm to 200 μm, and
   the boron nitride particles have a ratio of 2.0 parts by weight or more and less than 5.0 parts by weight with respect to 100 parts by weight of the aluminum nitride particles.

2. The glass-coated aluminum nitride particles according to claim 1, wherein an average aspect ratio of the aluminum nitride particles is 0.8 or more.

3. A method for producing the glass-coated aluminum nitride particles according to claim 1, wherein
   a volume cumulative d50 of a glass frit which is a raw material of the glass phase is 0.3 μm to 50 μm, comprising
   a first step of forming a mixture by mixing the aluminum nitride particles, the glass frit, and boron nitride particles having a volume cumulative d50 of 0.3 μm to 30 μm,
   a second step of obtaining coated particles by coating the glass frit onto the aluminum nitride particles by heat treating the mixture after the completion of the first step, at a temperature of the glass transition temperature of the glass frit or more, and 2000° C. or less, and
   a third step of grinding the coated particles after the completion of the second step, to make particles with a volume cumulative d50 of 10 μm to 200 μm.

4. The method for producing glass-coated aluminum nitride particles according to claim 3, wherein the second step is carried out under an atmosphere which does not include oxygen.

5. The method for producing glass-coated aluminum nitride particles according to claim 3, wherein the heat treatment of the second step is carried out at 400° C. to 1400° C., in a range of 30 min to 3 hrs.

6. The method for producing glass-coated aluminum nitride particles according to claim 3, further comprising, between the first step and the second step, a step of shaping by applying pressure to the mixture of the aluminum nitride particles, the glass frit, and the boron nitride particles.

7. The method for producing glass-coated aluminum nitride particles according to claim 6, wherein the shaping step is carried out at a pressure of 10 MPa to 300 MPa.

8. A heat dissipating resin composition comprising the glass-coated aluminum nitride particles according to claim 1.

9. Glass-coated aluminum nitride particles comprising aluminum nitride particles, and
a glass phase covering at least a part of a surface of the aluminum nitride particles,
wherein
the glass phase is a composition comprising at least a glass component, and the composition comprising the glass component has a ratio of 0.2 parts by weight to 5.0 parts by weight with respect to 100 parts by weight of the aluminum nitride particles, and the composition comprising the glass component further comprises boron nitride particles, and the aluminum nitride particles have a volume cumulative d50 of 10 μm to 200 μm, and
the glass component comprises $SiO_2$, $Al_2O_3$, and $B_2O_3$.

* * * * *